（12） United States Patent
Chen et al.

(10) Patent No.: US 10,614,769 B2
(45) Date of Patent: Apr. 7, 2020

(54) GOA CIRCUIT AND DRIVING METHOD THEREOF, AND TOUCH DISPLAY APPARATUS

(71) Applicants: Chongqing BOE Optoelectronics Technology Co., Ltd., Chongqing (CN); BOE TECHNOLOGY GROUP CO., LTD., Beijing (CN)

(72) Inventors: Shuai Chen, Beijing (CN); Xing Dong, Beijing (CN); Zhenguo Tian, Beijing (CN); Xuebo Liang, Beijing (CN); Lijun Xiong, Beijing (CN); Xiuzhu Tang, Beijing (CN); Shuang Hu, Beijing (CN)

(73) Assignees: CHONGQING BOE OPTOELECTRONICS TECHNOLOGY CO., LTD., Chongqing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/374,558

(22) Filed: Apr. 3, 2019

(65) Prior Publication Data
US 2019/0311690 A1  Oct. 10, 2019

(30) Foreign Application Priority Data
Apr. 10, 2018 (CN) .......................... 2018 1 0316406

(51) Int. Cl.
G06F 3/041 (2006.01)
G09G 3/36 (2006.01)

(52) U.S. Cl.
CPC ......... *G09G 3/3677* (2013.01); *G06F 3/0412* (2013.01); *G06F 3/0416* (2013.01); *G09G 2300/0408* (2013.01); *G09G 2300/0426* (2013.01); *G09G 2310/08* (2013.01)

(58) Field of Classification Search
CPC combination set(s) only.
See application file for complete search history.

(56) References Cited

U.S. PATENT DOCUMENTS

| | | | |
|---|---|---|---|
| 2016/0335962 A1* | 11/2016 | Xiao | G09G 3/36 |
| 2017/0186393 A1* | 6/2017 | Wang | G09G 3/36 |
| 2017/0256217 A1* | 9/2017 | Xiao | G09G 3/3677 |
| 2019/0019471 A1* | 1/2019 | Zeng | G02F 1/1368 |

* cited by examiner

Primary Examiner — Van N Chow
(74) Attorney, Agent, or Firm — McDermott Will & Emery LLP

(57) ABSTRACT

A GOA circuit includes a plurality of GOA units. First input terminals of a first-level GOA unit to a (N/2)th-level GOA unit are coupled to a first signal terminal, and a first input terminal of any one of other GOA units is coupled to an output terminal of a (N/2)th-level GOA unit located in front of the any one of other GOA units. Second input terminals of a last-level GOA unit to a (N/2)th last-level GOA unit are coupled to a second signal terminal, and a second input terminal of any one of other GOA units is coupled to an output terminal of a (N/2)th-level GOA unit located behind the any one of other GOA units. N is the number of clock signals in one clock period. N/2 cascaded GOA units of the GOA circuit are included in a pull-up node potential holding unit, and output terminals of the N/2 cascaded GOA units are not coupled to gate lines.

14 Claims, 7 Drawing Sheets

GOA CIRCUIT AND DRIVING METHOD THEREOF, AND TOUCH DISPLAY APPARATUS

CROSS-REFERENCE TO RELATED APPLICATION

This application claims priority to Chinese Patent Application No. 201810316406.9, filed with the Chinese Patent Office on Apr. 10, 2018, titled "GOA CIRCUIT AND DRIVING METHOD THEREOF, AND TOUCH DISPLAY APPARATUS", which is incorporated herein by reference in its entirety.

TECHNICAL FIELD

The present disclosure relates to the field of display technologies, and in particular, to a GOA circuit and a driving method thereof, and a touch display apparatus.

BACKGROUND

In order to pursue a lower cost and a narrower bezel of a liquid crystal display (LCD), a gate driver on array (GOA) technology, in which thin film transistors (TFTs) each driven by a corresponding gate are directly fabricated on a base substrate of an array substrate, is increasingly used in LCD products, thereby eliminating a space occupation of an integrated circuit (IC) bonding area and a fan-out area, and reducing the cost in materials and manufacturing processes etc., and narrowing the frames on both sides of gate lines of a panel.

SUMMARY

In a first aspect, a GOA circuit is provided. The GOA circuit includes a plurality of cascaded GOA units, and each GOA unit includes a first input terminal, a second input terminal, an output terminal, voltage terminals and a clock signal terminal. The GOA circuit is configured to receive N clock signals in one clock period, and the clock signal terminal of the GOA unit is configured to receive one of the N clock signals in one clock period, and N is a positive even number. First input terminals of a first-level GOA unit to a (N/2)th-level GOA unit are coupled to a first signal terminal, a first input terminal of a (N/2+1)th-level GOA unit is coupled to an output terminal of the first-level GOA unit, a first input terminal of a (N/2+2)th-level GOA unit is coupled to an output terminal of a second-level GOA unit, and so on. Second input terminals of a last-level GOA unit to a (N/2)th last-level GOA unit are coupled to a second signal terminal, a second input terminal of a (N/2+1)th last-level GOA unit is coupled to an output terminal of the last-level GOA unit, a second input terminal of a (N/2+2)th last-level GOA unit is coupled to an output terminal of a second last-level GOA unit, and so on. N/2 cascaded GOA units of the plurality of cascaded GOA units are included in a pull-up node potential holding unit, and output terminals of the GOA units in the pull-up node potential holding unit are not coupled to gate lines.

In some embodiments, the GOA unit further includes a first input sub-circuit, a second input sub-circuit, an output sub-circuit, a pull-down control sub-circuit and a pull-down sub-circuit. The first input sub-circuit is coupled to the first input terminal and a pull-up node, and the first input sub-circuit is configured to input a signal from the first input terminal to the pull-up node under control of the first input terminal. The second input sub-circuit is coupled to the second input terminal, the pull-up node and a first voltage terminal, and the second input sub-circuit is configured to output a signal from the first voltage terminal to the pull-up node under control of the second input terminal. The output sub-circuit is coupled to the pull-up node, the clock signal terminal and the output terminal, and the output sub-circuit is configured to output a signal from the clock signal terminal to the output terminal under control of a potential at the pull-up node. The pull-down control sub-circuit is coupled to a second voltage terminal, the pull-up node, a pull-down node and the first voltage terminal, and the pull-down control sub-circuit is configured to output the signal from the first voltage terminal to the pull-down node under control of a potential at the pull-up node, and output a voltage from the second voltage terminal to the pull-down node under control of the second voltage terminal. The pull-down sub-circuit is coupled to the pull-down node, the pull-up node, the output terminal and the first voltage terminal, and the pull-down sub-circuit is configured to output the signal from the first voltage terminal to the the output terminal and the pull-up node under control of a potential at the pull-down node.

In some embodiments, each of (N/2)-level GOA units disposed behind the pull-up node potential holding unit further includes a denoising sub-circuit. The denoising sub-circuit of any GOA unit of the (N/2)-level GOA units located behind the pull-up node potential holding unit is coupled to the first voltage terminal, an output terminal of the same-level GOA unit and an output terminal of a corresponding-level GOA unit in the pull-up node potential holding unit. The denoising sub-circuit is configured to denoise an output signal of the output terminal of the same-level GOA unit under control of the output signal from the output terminal of the corresponding-level GOA unit in the pull-up node potential holding unit in a touch scan period.

In some embodiments, the first input sub-circuit includes a first transistor, a gate and a first electrode of the first transistor is coupled to the first input terminal, and a second electrode of the first transistor is coupled to the pull-up node.

In some embodiments, the second input sub-circuit includes a second transistor, a gate of the second transistor is coupled to the second input terminal, a first electrode of the second transistor is coupled to the pull-up node, and a second electrode of the second transistor is coupled to the first voltage terminal.

In some embodiments, the output sub-circuit includes a third transistor and a first capacitor. A gate of the third transistor is coupled to the pull-up node, a first electrode of the third transistor is coupled to the clock signal terminal, and a second electrode of the third transistor is coupled to the output terminal. One end of the first capacitor is coupled to the pull-up node, and another end of the first capacitor is coupled to the output terminal.

In some embodiments, the pull-down control sub-circuit includes a fourth transistor, a fifth transistor, a sixth transistor and a seventh transistor. A gate and a first electrode of the fourth transistor are coupled to the second voltage terminal, and a second electrode of the fourth transistor is coupled to a gate of the fifth transistor and a first electrode of the seventh transistor. A first electrode of the fifth transistor is coupled to the second voltage terminal, and a second electrode of the fifth transistor is coupled to the pull-down node. A gate of the sixth transistor is coupled to the pull-up node, a first electrode of the sixth transistor is coupled to the pull-down node, and a second electrode of the sixth transistor is coupled to the first voltage terminal. A gate of the seventh transistor is coupled to the pull-up node, and a second electrode of the seventh transistor is coupled to the first voltage terminal.

In some embodiments, the pull-down sub-circuit includes an eighth transistor and a ninth transistor. A gate of the eighth transistor is coupled to the pull-down node, a first electrode of the eighth transistor is coupled to the pull-up node, and a second electrode of the eighth transistor is coupled to the first voltage terminal. A gate of the ninth transistor is coupled to the pull-down node, a first electrode of the ninth transistor is coupled to the output terminal, and a second electrode of the nine transistor is coupled to the first voltage terminal.

In some embodiments, the denoising sub-circuit includes a tenth transistor. A gate of the tenth transistor is coupled to the output terminal of the corresponding-level GOA unit in the pull-up node potential holding unit, a first electrode of the tenth transistor is coupled to the output terminal of the same-level GOA unit, and a second electrode of the tenth transistor is coupled to the first voltage terminal.

In some embodiments, the transistor is a N-type transistor or a P-type transistor.

In a second aspect, a method of driving the GOA circuit according to the first aspect is provided. The driving method includes: in a touch scan period, providing low level clock signals to (N/2)-level GOA units located behind the pull-up node potential holding unit, so that gate line scan signals are not output from the (N/2)-level GOA units located behind the pull-up node potential holding unit in the touch scan period; and providing a high level clock signal to each GOA unit in the pull-up node potential holding unit, so that a high level signal is output from an output terminal of each GOA unit in the pull-up node potential holding unit, thereby causing that pull-up nodes of the (N/2)-level GOA units located behind the pull-up node potential holding unit are maintained at a high level in the touch scan period.

In some embodiments, each of the (N/2)-level GOA units located behind the pull-up node potential holding unit includes a denoising sub-circuit, and the method further includes: in the touch scan period, controlling the denoising sub-circuit by using a high level signal output from an output terminal of a corresponding GOA unit in the pull-up node potential holding unit, so that the denoising sub-circuit denoises an output signal from a corresponding one of the (N/2)-level GOA units located behind the pull-up node potential holding unit.

In some embodiments, the method of driving the GOA circuit further includes: in an input period, inputting, by a first input sub-circuit, a signal from the first input terminal to a pull-up node under control of the first input terminal; in an output period, outputting, by an output sub-circuit, a signal from the clock signal terminal as a gate line scan signal to the output terminal under control of a potential at the pull-up node; and in a reset period, pulling down, by a second input sub-circuit, a potential at the pull-up node to a potential at a first voltage terminal under control of the second input terminal, outputting, by a pull-down control sub-circuit, a signal from the second voltage terminal to a pull-down node under control of the second voltage terminal, and pulling down, by a pull-down sub-circuit, potentials at the output terminal and the pull-up node to the potential at the first voltage terminal under control of a potential at the pull-down node. The input period, the output period and the reset period are included in a display period.

In a third aspect, a touch display apparatus is provided. The touch display apparatus includes the GOA circuit according to the first aspect.

BRIEF DESCRIPTION OF THE DRAWINGS

In order to describe technical solutions in embodiments of the present disclosure more clearly, the accompanying drawings to be used in the description of disclosure will be introduced briefly. Obviously, the accompanying drawings to be described below are merely some embodiments of the present disclosure, and a person of ordinary skill in the art can obtain other drawings according to these drawings without paying any creative effort.

DETAILED DESCRIPTION

The technical solutions in the embodiments of the present disclosure will be described clearly and completely below with reference to the accompanying drawings in the embodiments of the present disclosure. Obviously, the described embodiments are merely some but not all of embodiments of the present disclosure. All other embodiments made on the basis of the embodiments of the present disclosure by a person of ordinary skill in the art without paying any creative effort shall be included in the protection scope of the present disclosure.

A touch screen generally uses an in cell touch technology to integrate touch elements into the liquid crystal display, so that the liquid crystal display does not need to be assembled with a touch panel to achieve a touch effect.

With a size of a touch screen gradually increasing, requirements for a touch report rate are also higher. The touch report rate is the number of times that contact information of the touch screen is reported to a host every second. Currently, a touch report method is to insert a touch scan signal between two display frames. That is, a touch scan period is inserted in a blanking period between two adjacent display frames (that is, a time period after an end of one image frame and before a start of a next image frame). This method is also referred to as a long horizon blanking (LHB) mode. The touch report rate of this mode is the same as a display frame rate, both of which are 60 Hz/s.

However, it will be noted that due to an existence of a touch scan period, in first few GOA units after the touch scan period, voltages on the pull-up nodes PU of the few GOA units may be attenuated due to the electric leakage of TFTs during the touch scan, thereby causing that gate turn-on signals output from the output terminals of the few GOA units, i.e., the gate turn-on signals output from the output terminals of the few GOA units that are different from other GOA units, are attenuated after the touch scan period, and causing that a horizontal line (H-line) phenomenon occurs at fixed positions in the pixel area, and resulting in a poor display.

Figure 1:
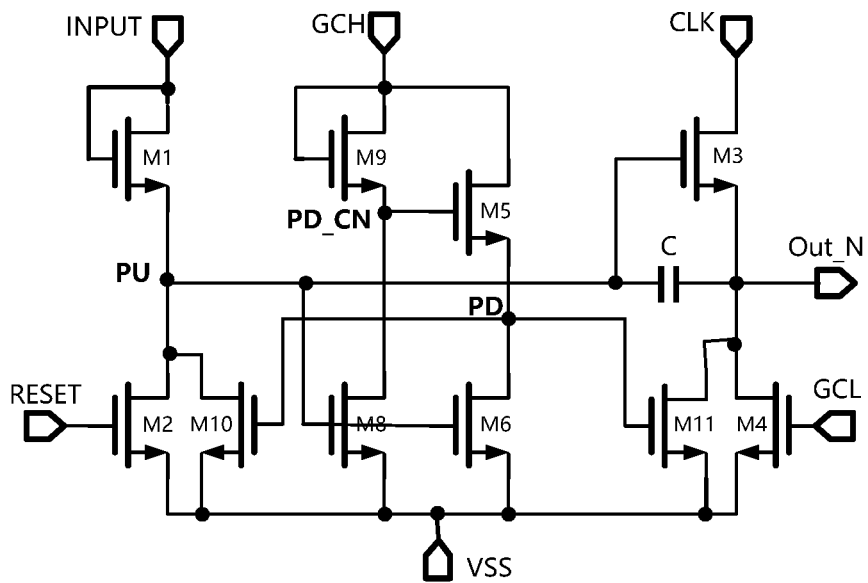
FIG. 1 is a schematic circuit diagram of a GOA unit used in a touch display screen.
Figure 2:
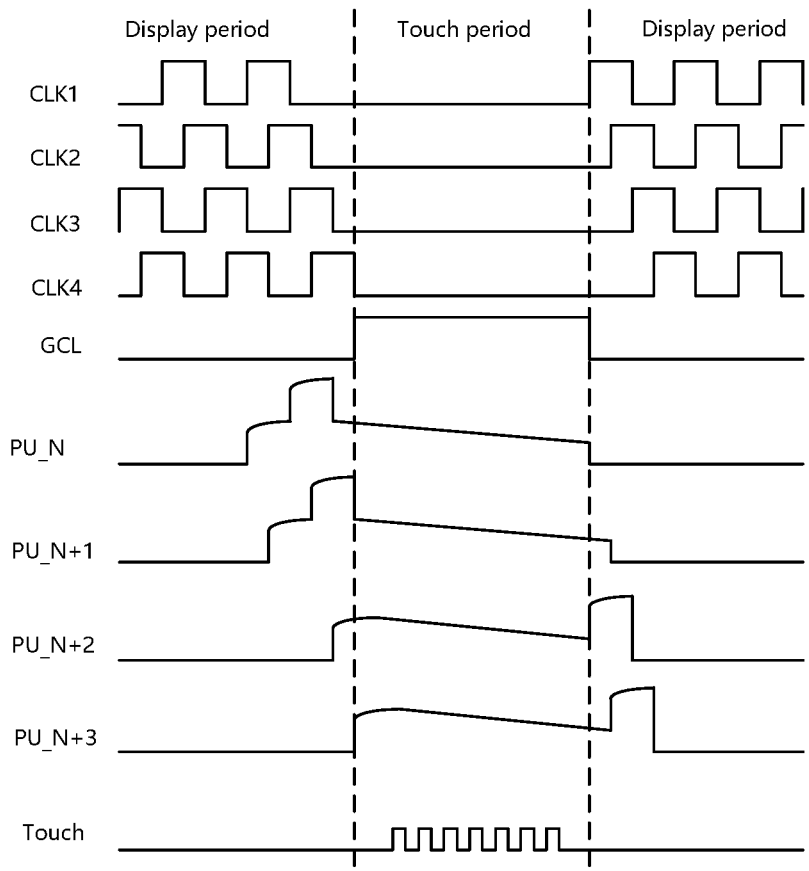
FIG. 2 shows a timing diagram of controlling a GOA circuit formed by cascading GOA units shown in FIG. 1.
Figure 3:
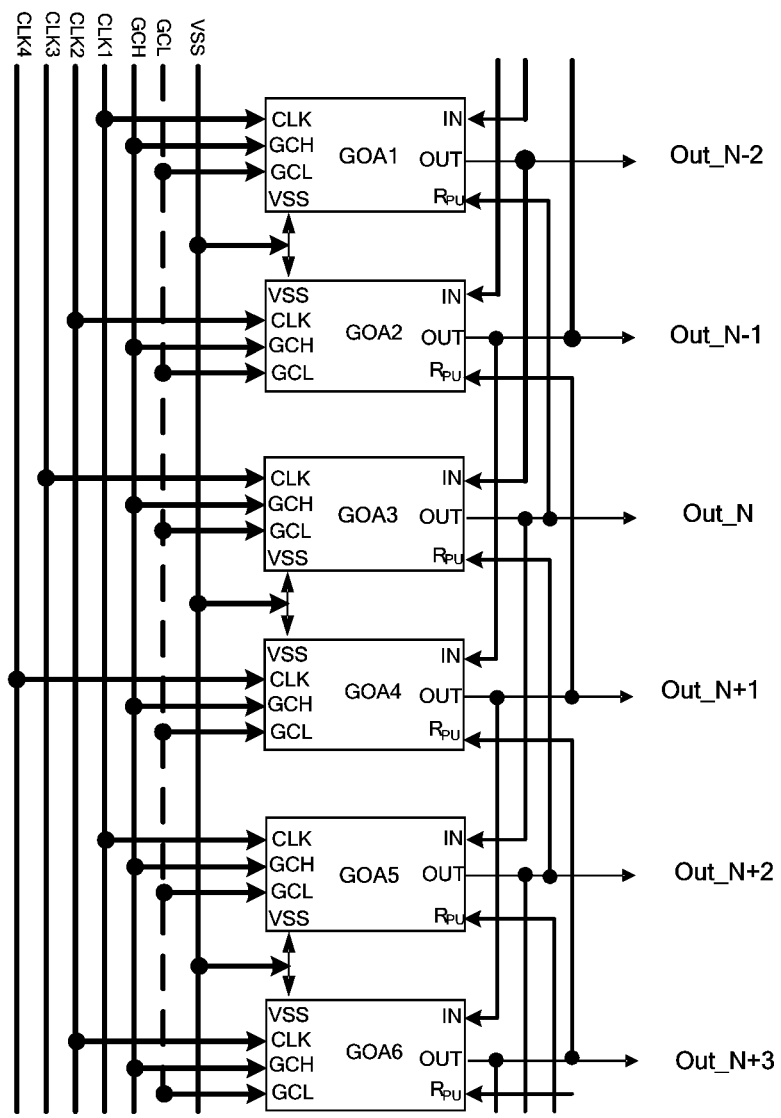
FIG. 3 is a schematic structural diagram of a GOA circuit formed by cascading GOA units shown in FIG. 1.

As shown in FIG. 1, a GOA unit used in a touch display screen includes ten transistors and one capacitor, which may be referred to as a 10T1C GOA unit. FIG. 3 is a schematic diagram of a GOA circuit formed by cascading a plurality of GOA units shown in FIG. 1. The GOA circuit uses 4 clock signals (i.e., CLK1, CLK2, CLK3, and CLK4), and the GOA circuit is applied into a touch display screen of the LHB mode. FIG. 2 shows a timing diagram of controlling the GOA circuit shown in FIG. 3.

As shown in FIGS. 2 and 3, a touch scan process is performed on a (N+1)th-level GOA unit and a (N+2)th-level GOA unit during the touch scan period. In the touch scan period, the clock signals CLK1, CLK2, CLK3, and CLK4 are all at a low level, and pull-up nodes PU of a Nth-level GOA unit, the (N+1)th-level GOA unit, the (N+2)th-level GOA unit and a (N+3)th-level GOA unit are always maintained at a high level. As shown in FIG. 2, due to the existence of the touch scan period, the voltages on the pull-up nodes PU of adjacent four GOA units, i.e., the Nth-level GOA unit, the (N+1)th-level GOA unit, the (N+2)th-level GOA unit and the (N+3)th-level GOA unit, may be attenuated due to the electric leakage of the TFTs in the four GOA units. After the end of the touch scan period, the gate line scan signals are output from the (N+2)th-level GOA unit and the (N+3)th-level GOA unit in sequence. However, since the voltages on the pull-up nodes PU of the (N+2)th-level GOA unit and the (N+3)th-level GOA unit are lower than the voltage required to normally turn on a gate of the transistor M3 shown in FIG. 1, the voltages of the gate line scan signals output from the (N+2)th-level GOA unit and the (N+3)th-level GOA unit are also low, thereby causing that the TFTs connected to corresponding gate lines are not fully turned on and that the H-line phenomenon occurs at the fixed positions.

The GOA unit shown in FIG. 1 uses a gate control high (GCH) signal as a denoising circuit control source (a DC denoising mode). As shown in FIG. 1, when the GCH signal is at a high level, a transistor M9 is turned on, and the high level of the GCH signal is transmitted to a gate of a transistor M5 under control of the GCH signal. In this case, the transistor M5 is turned on, which causes that the high level of the GCH signal is output to the pull-down node PD under the control of the GCH signal. Since the pull-down node PD is coupled to a gate of a transistor M11, the transistor M11 is turned on, and a potential at the output terminal of the GOA unit is pulled down by the transistor M11 to a potential at the voltage terminal VSS, thereby denoising the output signal of the GOA unit. However, as shown in FIGS. 1 and 2, in the touch scan period, the pull-up nodes PU of the Nth-level GOA unit, the (N+1)th-level GOA unit, the (N+2)th-level GOA unit and the (N+3)th-level GOA unit are at a high level. In this case, a transistor M6 is turned on, the potential at the pull-down node PD is pulled down by the transistor M6 to the potential at the voltage terminal VSS, and the pull-down node PD is at a low level. In this case, the transistor M3 is turned on and the clock signal is transmitted to the output terminal OUT of the GOA unit, and the transistor M11 for denoising the output signal of the GOA unit is not turned on. When a touch signal is coupled to the clock signal, the Nth-level GOA unit, the (N+1)th-level GOA unit, the (N+2)th-level GOA unit and the (N+3)th-level GOA unit may output signals with noise.

In order to avoid the above problem, as shown in FIGS. 1 and 3, a gate control low (GCL) signal and a transistor M4 are introduced into the GOA circuit, and the GCL signal is at a high level in the touch scan period, which causes the transistor M4 to be turned on to denoise the output signal of the GOA unit described above in this period.

In summary, due to the existence of the touch scan period, the electric leakage of the pull-up nodes of several GOA units required to be turned on in the touch display screen occurs, which causes that the H-line phenomenon occurs at the fixed positions due to insufficient output voltages from the several GOA units after the end of the touch scan period. Moreover, since the GCL signal is introduced, a wire width of a pulse generator (PLG) and the number of transistors are increased, and thereby a power consumption of the GOA circuit is increased.

Figure 4:
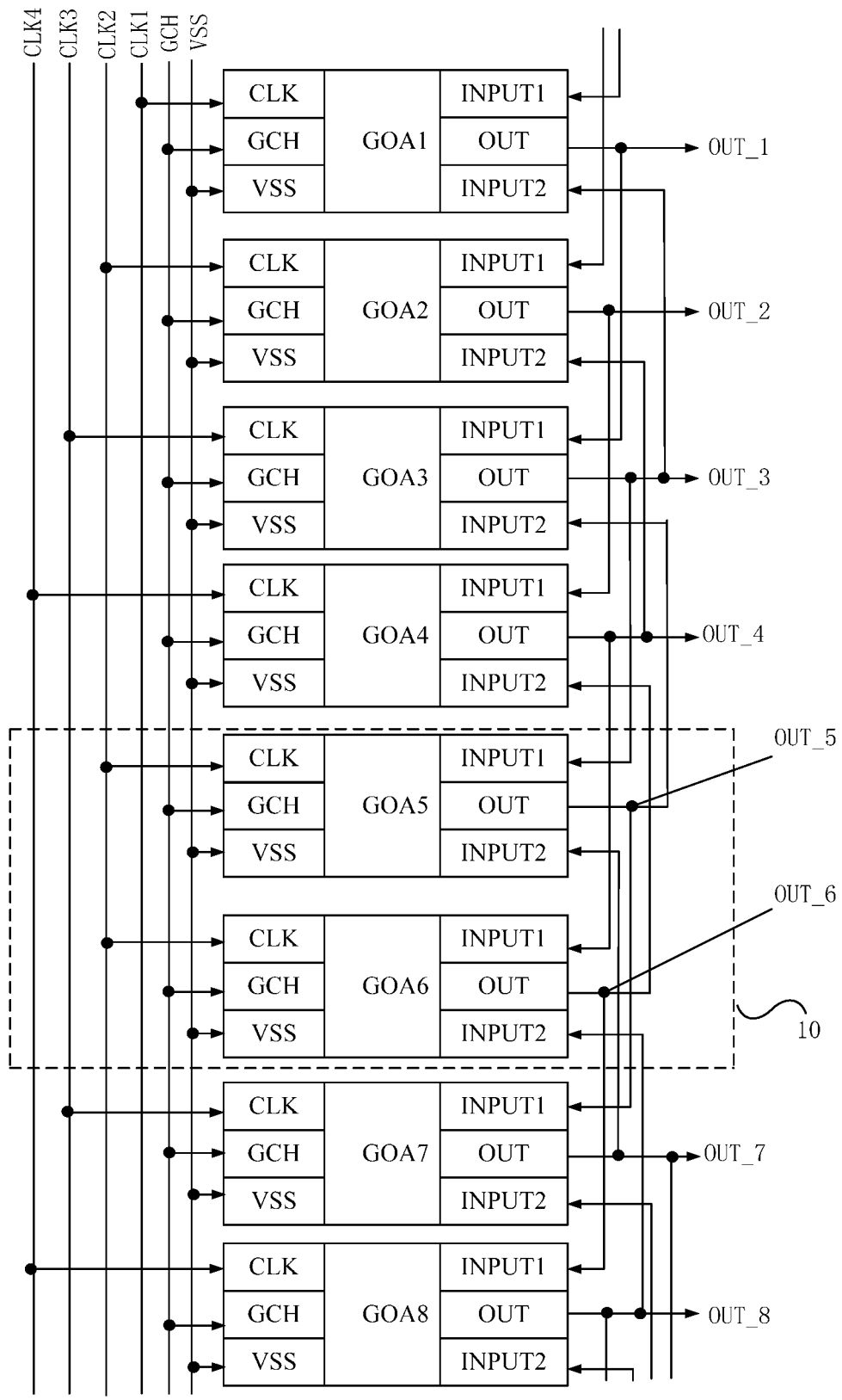
FIG. 4 is a schematic structural diagram of a GOA circuit according to some embodiments of the present disclosure.

Based on this, some embodiments of the present disclosure provide a GOA circuit. As shown in FIG. 4, the GOA circuit includes a plurality of cascaded GOA units, and each GOA unit includes a first input terminal INPUT1, a second input terminal INPUT2, an output terminal OUT, voltage terminals (including a first voltage terminal VSS and a second voltage terminal GCH) and a clock signal terminal CLK.

The GOA circuit is configured to receive N clock signals in one clock period, and the clock signal terminal CLK of each GOA unit is configured to receive one of the N clock signals in one clock period. N is a positive even number.

First input terminals INPUT1 of a first-level GOA unit to a (N/2)th-level GOA unit are coupled to a first signal terminal, a first input terminal INPUT1 of a (N/2+1)th-level GOA unit is coupled to an output terminal OUT of the first-level GOA unit, a first input terminal INPUT1 of a (N/2+2)th-level GOA unit is coupled to an output terminal OUT of a second-level GOA unit, and so on.

Second input terminals INPUT2 of a last-level GOA unit to a (N/2)th last-level GOA unit are coupled to a second signal terminal, a second input terminal INPUT2 of a (N/2+1)th last-level GOA unit is coupled to an output terminal OUT of the last-level GOA unit, a second input terminal INPUT2 of a (N/2+2)th last-level GOA unit is coupled to an output terminal OUT of a second last-level GOA unit, and so on.

In some embodiments, as shown in FIG. 4, N/2 cascaded GOA units of the plurality of cascaded GOA units are included in a pull-up node potential holding unit 10, and output terminals of the GOA units in the pull-up node potential holding unit 10 are not coupled to gate lines, that is, these GOA units do not output gate line scan signals.

In some embodiments, as shown in FIG. 4, N is equal to 4, that is, the number of the clock signals received by the GOA circuit in one clock period is 4. First input terminals INPUT1 of a GOA1 and a GOA2 are coupled to the first signal terminal. In this case, N/2+1 is equal to 3, and thus a first input terminal INPUT1 of a GOA3 is coupled to an output terminal OUT of the GOA1. Second input terminals INPUT2 of a GOA7 and a GOA8 are coupled to the second signal terminal. In addition, N/2+1 is equal to 3, and thus a second input terminal INPUT2 of a third last-level GOA (i.e., GOA6) is coupled to an output terminal OUT of the last-level GOA (i.e., GOA8). A touch scan process is performed on a GOA5 and a GOA6 during the touch scan period. In this case, N/2 cascaded GOA units, i.e., the GOA5 and the GOA6, are included in the pull-up node potential holding unit 10, and output terminals of the GOA5 and the GOA6 are not coupled to gate lines, that is, the GOA5 and the GOA6 do not output gate line scan signals.

In some embodiments, the number of the clock signals received by the GOA circuit in one clock period is 6, and the pull-up node potential holding unit 10 includes three cascaded GOA units. In some other embodiments, the number of the clock signals received by the GOA circuit in one clock period is 8, and the pull-up node potential holding unit 10 includes 4 cascaded GOA units, and so on.

In some embodiments, signals from the first signal terminal and the second signal terminal are not limited. For example, the signals from the first signal terminal and the second signal terminal are both start signals. Based on this, the last-level GOA unit to the (N/2)th last-level GOA unit are reset through the start signal, and the gate turn-on signals are started to be output from the first-level GOA unit to the (N/2)th-level GOA units under control of the start signal.

In the GOA circuit provided by some embodiments of the present disclosure, the pull-up node PU of each GOA unit in the pull-up node potential holding unit 10 is at a high level in the touch scan period, and in this period, a high level clock signal is input to each GOA unit in the pull-up node potential holding unit 10, so that the pull-up nodes of the (N/2)-level GOA units located behind the pull-up node potential holding unit 10 are maintained at a high level. As a result, the electrical leakage of the pull-up node PU of the several GOA units required to be turned on is avoided in the touch scan period, thereby avoiding a problem that the H-line phenomenon occurs at the fixed position in the pixel area due to the insufficient output voltages from the several GOA units after the end of the touch scan period.

Figure 5:
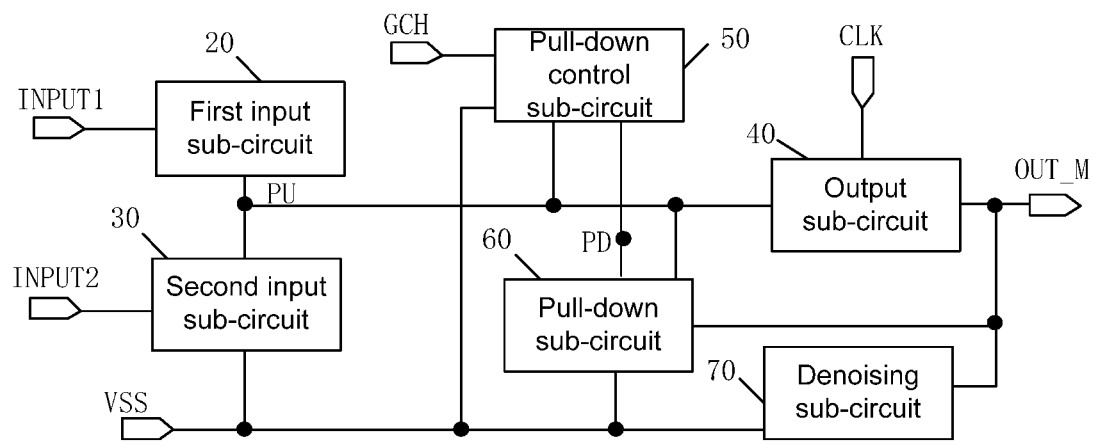
FIG. 5 is a schematic structural diagram of one of GOA units in the GOA circuit shown in FIG. 4 according to some embodiments of the present disclosure.

In some embodiments, as shown in FIG. 5, each GOA unit further includes a first input sub-circuit 20, a second input sub-circuit 30, an output sub-circuit 40, a pull-down control sub-circuit 50 and a pull-down sub-circuit 60.

In some embodiments, the first input sub-circuit 20 is coupled to the first input terminal INPUT1 and the pull-up node PU. A position on a connection line between the first input sub-circuit 20 and the second input sub-circuit 30 is provided as the pull-up node PU. The first input sub-circuit 20 is configured to input a signal from the first input terminal INPUT1 to the pull-up node PU under control of the first input terminal INPUT1.

In some embodiments, the second input sub-circuit 30 is coupled to the second input terminal INPUT2, the pull-up node PU and the first voltage terminal VSS, and the second input sub-circuit 30 is configured to output a signal from the first voltage terminal VSS to the pull-up node PU under control of the second input terminal INPUT2.

In some embodiments, the output sub-circuit 40 is coupled to the pull-up node PU, the clock signal terminal CLK and the output terminal OUT, and the output sub-circuit 40 is configured to output a signal from the clock signal terminal CLK to the output terminal OUT under control of a potential at the pull-up node PU.

In some embodiments, the pull-down control sub-circuit 50 is coupled to the second voltage terminal GCH, the pull-up node PU, the pull-down node PD and the first voltage terminal VSS. A position on a connection line between the pull-down control sub-circuit 50 and the pull-down sub-circuit 60 is provided as the pull-down node PD. The pull-down control sub-circuit 50 is configured to output a signal from the first voltage terminal VSS to the pull-down node PD under the control of a potential at the pull-up node PU, and output a signal from the second voltage terminal GCH to the pull-down node PD under control of the second voltage terminal GCH.

In some embodiments, the pull-down sub-circuit 60 is coupled to the pull-down node PD, the pull-up node PU, the output terminal OUT and the first voltage terminal VSS, and the pull-down sub-circuit 60 is configured to output a signal from the first voltage terminal VSS to the output terminal OUT and the pull-up node PU under control of a potential at the pull-down node PD.

Figure 6:
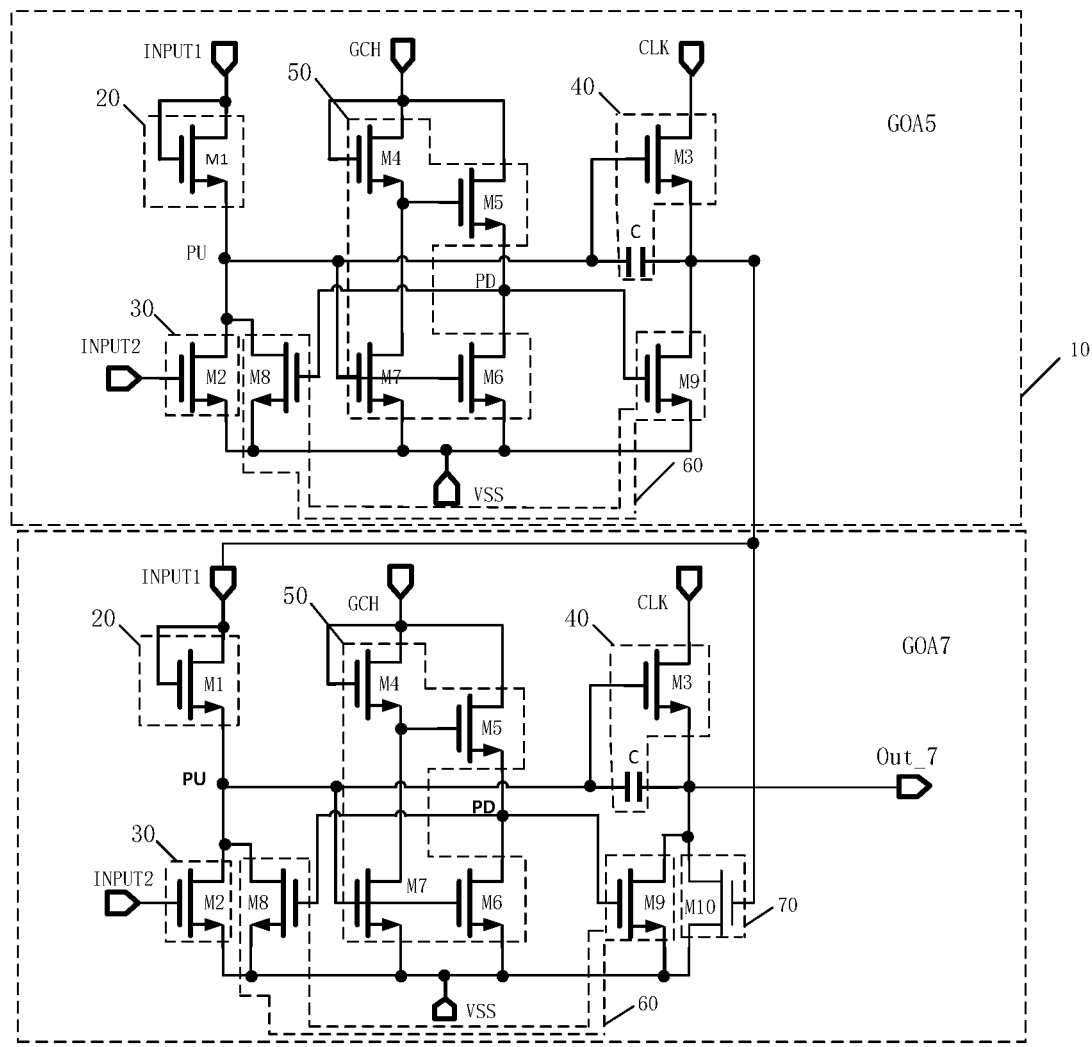
FIG. 6 is a schematic circuit diagram of GOA units shown in FIG. 5 according to some embodiments of the present disclosure.

FIG. 6 is a schematic circuit diagram of two GOA units in a GOA circuit according to some embodiments of the present disclosure. The structure of each sub-circuit of each GOA unit will be described below with reference to FIG. 6.

In some embodiments, as shown in FIG. 6, the first input sub-circuit 20 includes a first transistor M1. A gate and a first electrode of the first transistor M1 are coupled to the first input terminal INPUT1, and a second electrode of the first transistor M1 is coupled to the pull-up node PU.

In some embodiments, the second input sub-circuit 30 includes a second transistor M2. A gate of the second transistor M2 is coupled to the second input terminal INPUT2, a first electrode of the second transistor M2 is coupled to the pull-up node PU, and a second electrode of the second transistor M2 is coupled to the first voltage terminal VSS.

In some embodiments, the output sub-circuit 40 includes a third transistor M3 and a first capacitor C. A gate of the third transistor M3 is coupled to the pull-up node PU, a first electrode of the third transistor M3 is coupled to the clock signal terminal CLK, and a second electrode of the third transistor M3 is coupled to the output terminal OUT. One end of the first capacitor C is coupled to the pull-up node PU, and another end of the first capacitor is coupled to the output terminal OUT.

In some embodiments, the pull-down control sub-circuit 50 includes a fourth transistor M4, a fifth transistor M5, a sixth transistor M6 and a seventh transistor M7. A gate and a first electrode of the fourth transistor M4 are coupled to the second voltage terminal, and a second electrode of the fourth transistor M4 is coupled to a gate of the fifth transistor M5 and a first electrode of the seventh transistor M7. A first electrode of the fifth transistor M5 is coupled to the second voltage terminal GCH, and a second electrode of the fifth transistor M5 is coupled to the pull-down node PD. A gate of the sixth transistor M6 is coupled to the pull-up node PU, a first electrode of the sixth transistor M6 is coupled to the pull-down node PD, and a second electrode of the sixth transistor M6 is coupled to the first voltage terminal VSS. A gate of the seventh transistor M7 is coupled to the pull-up node PU, and a second electrode of the seventh transistor M7 is coupled to the first voltage terminal VSS.

In some embodiments, the pull-down sub-circuit 60 includes an eighth transistor M8 and a ninth transistor M9. A gate of the eighth transistor M8 is coupled to the pull-down node PD, a first electrode of the eighth transistor M8 is coupled to the pull-up node PU, and a second electrode of the eight transistor M8 is coupled to the first voltage terminal VSS. A gate of the ninth transistor M9 is coupled to the pull-down node PD, a first electrode of the ninth transistor M9 is coupled to the output terminal OUT, and a second electrode of the ninth transistor M9 is coupled to the first voltage terminal VSS.

In some embodiments, any sub-circuit of the above sub-circuits further includes a plurality of transistors connected in series with any transistor included in the sub-circuit. In some embodiments, the transistors described above are all P-type transistors or N-type transistors. In some examples, the transistors described above are all P-type transistors, the first electrodes are sources and the second electrodes are drains. In some other examples, the transistors described above are all N-type transistors, the first electrodes are drains and the second electrodes are sources. The embodiments of the present disclosure are illustrated by taking an example in which each transistor is an N-type transistor. In this case, the first voltage terminal VSS is configured to receive a constant low level, and the second voltage terminal GCH is configured to receive a constant high level.

In the GOA circuit shown in FIG. 4, the GOA5 and the GOA6 constitute the pull-up node potential holding unit 10, and the (N/2)-level GOA units located behind the pull-up node potential holding unit 10 are a GOA7 and a GOA8. For example, FIG. 6 only shows a cascading relationship and circuit structures of the GOA5 and the GOA7. The cascading relationship and the circuit structures of the GOA6 and the GOA8 are the same as the cascading relationship and the circuit structures of the GOA5 and the GOA7, which will not be repeated in the embodiments of the present disclosure.

In some embodiments, a working process of each GOA unit may be divided into a display period and a touch scan period in an image frame. The display period includes an input period, an output period and a reset period. The working process of the GOA circuit shown in FIG. 6 according to some embodiments will be described below with reference to FIG. 7.

In the input period, INPUT1=1, INPUT2=0, CLK=0, PD=0, OUT=0, and PU=1 in which "1" indicates a high level and "0" indicates a low level.

Figure 7:
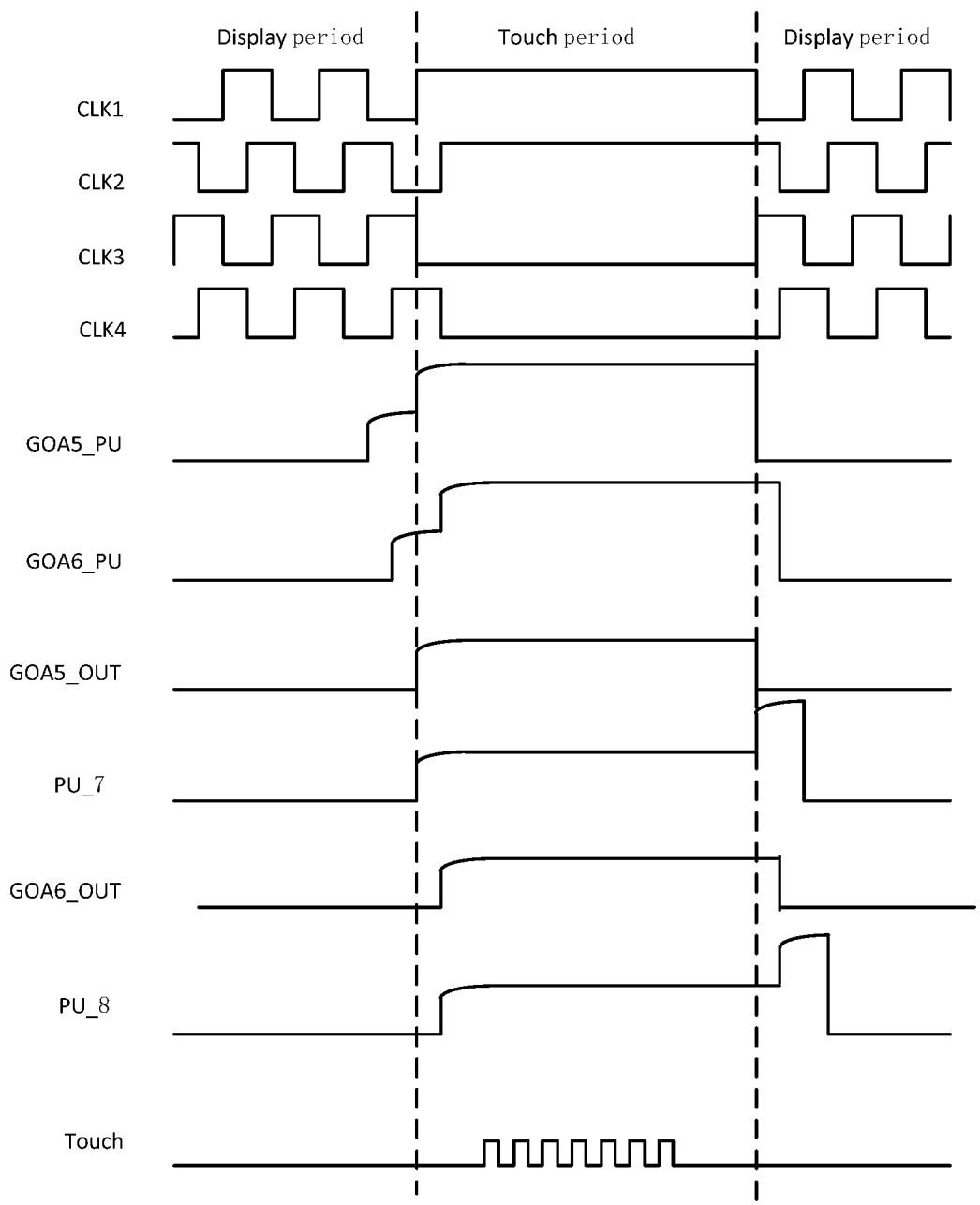
FIG. 7 shows a timing diagram of controlling the GOA circuit shown in FIG. 4 according to the embodiments of the present disclosure.

In some embodiments, as shown in FIGS. 6 and 7, the first transistor M1 is turned on under the control of the first input terminal INPUT1, the high level of the first input terminal INPUT1 is output to the pull-up node PU via the first transistor M1, and the high level is stored in the first capacitor C. The sixth transistor M6 and the seventh transistor M7 are turned on under the control of the potential at the pull-up node PU, and a potential at the gate of the fifth transistor M5 is pulled down to the potential at the first voltage terminal VSS via the seventh transistor M7. The fourth transistor M4 is turned on under the control of the second voltage terminal GCH, and the high level of the second voltage terminal GCH is output to the gate of the fifth transistor M5 via the fourth transistor M4. A width to length ratio of the fourth transistor M4 and a width to length ratio of the seventh transistor M7 are set, so that the gate of the fifth transistor M5 is at a low level, that is, the fifth transistor M5 is in an off state. Moreover, the potential at the pull-down node PD is pulled down to a low level of the first voltage terminal VSS via the sixth transistor M6, and the eighth transistor M8 and the ninth transistor M9 are in an off state under the control of the potential at the pull-down node PD. The second transistor M2 is in an off state under the control of the second input terminal INPUT2.

The third transistor M3 is turned on under the control of the potential at the pull-up node PU, and a low level of the clock signal terminal CLK is output to the output terminal OUT via the third transistor M3.

In the output period, the signal from the clock signal terminal CLK is output as a gate line scan signal by the output sub-circuit 40 to the output terminal OUT under the control of the potential at the pull-up node PU. INPUT1=0, INPUT2=0, CLK=1, PD=0, OUT=1, PU=1, and PD=0.

In some embodiments, since the first input terminal INPUT1 receives a low level, the first transistor M1 is in an off state, and the pull-up node PU is maintained at a high level under an action of the first capacitor C, so that the third transistor M3 is maintained in an on state. In this case, a high level of the clock signal terminal CLK is output as a gate line scan signal to the output terminal OUT via the third transistor M3 to scan a gate line to which the output terminal OUT is coupled. Moreover, under a bootstrap action of the first capacitor C, the potential at the pull-up node PU is further increased.

In addition, the states of the second transistor M2, the fourth transistor M4, the fifth transistor M5, the sixth transistor M6, the seventh transistor M7, the eighth transistor M8 and the ninth transistor M9 are the same as the states in the input period, which are not repeated here.

In the reset period, the potential at the pull-up node PU is pulled down by the second input sub-circuit 30 to the potential at the first voltage terminal VSS under the control of the second input terminal INPUT2, and the voltage from the second voltage terminal GCH is output by the pull-down control sub-circuit 50 to the pull-down node PD under the control of the second voltage terminal GCH. Under the control of the potential at the pull-down node PD, potentials at the output terminal OUT and the pull-up node PU are pulled down by the pull-down sub-circuit 60 to the potential at the first voltage terminal VSS. INPUT1=0, INPUT2=1, CLK=0, OUT=0, PU=0, and PD=1.

In some embodiments, the first transistor M1 is in an off state under the control of the first input terminal INPUT1. The second transistor M2 is turned on under the control of the second input terminal INPUT2, thereby the potential at the pull-up node PU is pull down to the potential at the first voltage terminal VSS via the second transistor M2. Under the control of the potential at the pull-up node PU, the third transistor M3, the sixth transistor M6, and the seventh transistor M7 are in an off state.

The fourth transistor M4 is turned on under the control of the second voltage terminal GCH, and the high level of the second voltage terminal GCH is output to the gate of the fifth transistor M5 via the fourth transistor M4. The fifth transistor M5 is turned on, and the high level of the second voltage terminal GCH is output to the pull-down node PD via the fifth transistor M5. The eighth transistor M8 and the ninth transistor M9 are turned on under the control of the potential at the pull-down node PD, the potential at the pull-up node PU is pulled down to the potential at the first voltage terminal VSS via the eighth transistor M8, and the potential at the output terminal OUT is pulled down to the potential at the first voltage terminal VSS via the ninth transistor M9.

In some embodiments, before a next image frame, the pull-down control sub-circuit 50 and the pull-down sub-circuit 60 are maintained in the reset state, so that the potential at the pull-down node PD is maintained at a high level, and the potentials at the output terminal OUT and the pull-up node PU are maintained at a low level under the control of the potential at the pull-down node PD.

The above is the working process of each GOA unit in the GOA circuit provided by some embodiments of the present disclosure in the display period. The working process of the GOA unit shown in FIG. 6 in the touch scan period in the embodiments of the present disclosure will be described below with reference to FIG. 7.

In some embodiments, in the touch scan period, low level clock signals are input to the (N/2)-level GOA units located behind the pull-up node potential holding unit 10, so that the gate line scan signals are not output from the (N/2)-level GOA units located behind the pull-up node potential holding unit 10 in the touch scan period.

High level clock signals are input to each GOA unit in the pull-up node potential holding unit 10, so that the high level clock signal is output from the output terminal of each GOA unit in the pull-up node potential holding unit 10, thereby causing that the pull-up nodes PU of the (N/2)-level GOA units located behind the pull-up node potential holding unit 10 are maintained at a high level in the touch scan period.

In some embodiments, taking FIG. 4 as an example, and with reference to FIG. 7, the low level clock signals are input to the GOA7 and the GOA8 in the touch scan period, so that the gate line scan signals are not output from the GOA7 and the GOA8 in the touch scan period. The high level clock signals are input to the GOA5 and the GOA6, so that the pull-up nodes PU of the GOA7 and the GOA8 are maintained at a high level in the touch scan period.

In some embodiments, as shown in FIGS. 4, 6 and 7, in the touch scan period, the pull-up nodes PU of the GOA5 and the GOA6 are at a high level. Since the clock signals of the GOA5 and the GOA6 are at a high level, an output signal OUT_5 of the GOA5 and an output signal OUT_6 of the GOA6 are at a high level. The output signal OUT_5 is input as a first input signal to the first input terminal INPUT1 of the GOA7, and the output signal OUT_6 is input as a first input signal to the first input terminal INPUT1 of the GOA8. In this case, the first transistors M1 in the GOA7 and the GOA8 are turned on, which causes that a high level of the output signal OUT_5 is input via the first transistor M1 in the GOA7 to a pull-up node PU_7 under control of the output signal OUT_5, and that a high level of the output signal OUT_6 is input via the first transistor M1 in the GOA8 to a pull-up node PU_8 under control of the output signal OUT_6, thereby ensuring that the pull-up node PU_7 and the pull-up node PU_8 may be maintained at a high level in the touch scan period, and avoiding the problem that the H-line phenomenon occurs at the fixed positions due to the insufficient output voltages from the GOA7 and the GOA8 after the end of the touch scan period.

In some embodiments, since the output terminals of the GOA5 and the GOA6 are not coupled to the gate lines, a display effect of a display panel will not be affected by the output signals of the GOA5 and the GOA6 in the touch scan period.

In some embodiments, since the pull-up nodes PU of the (N/2)-level GOA units located behind the pull-up node potential holding unit 10 are at a high level, for example, the pull-up node PU_7 of the GOA7 and the pull-up node PU_8 of the GOA8 are at a high level in the touch scan period, which causes that the third transistors M3 in the GOA7 and the GOA8 are turned on, and the low level of the clock signal terminal CLK is output to the output terminal OUT via the third transistor M3 in each of GOA7 and the GOA8.

In some embodiments, as shown in FIGS. 4-6, each of the (N/2)-level GOA units located behind the pull-up node potential holding unit 10 further includes a denoising sub-circuit 70. In the (N/2)-level GOA units located behind the pull-up node potential holding unit 10, the denoising sub-circuit 70 of any GOA unit is coupled to the first voltage terminal VSS, the output terminal OUT of the same-level GOA unit and the output terminal OUT of a corresponding-level GOA unit in the pull-up node potential holding unit 10. The denoising sub-circuit 70 is configured to denoise the output signal of the output terminal OUT of the same-level GOA unit under control of the output signal of the output terminal OUT of the corresponding-level GOA unit in the pull-up node potential holding unit 10 in the touch scan period.

In some embodiments, with reference to FIG. 6, the denoising sub-circuit 70 includes a tenth transistor M10. A gate of the tenth transistor M10 is coupled to the output terminal OUT of the corresponding-level GOA unit in the pull-up node potential holding unit 10, a first electrode of the ten-transistor M10 is coupled to the output terminal OUT of the same-level GOA unit, and a second electrode of the tenth transistor M10 is coupled to the first voltage terminal VSS.

In some embodiments, in the touch scan period, the tenth transistors M10 in the GOA7 and the GOA8 are turned on under the control of the output signal OUT_5 of the GOA5 and the output signal OUT_6 of the GOA6, and potentials at the output terminals OUT of the GOA7 and the GOA8 are pulled down to the potential at the first voltage terminal VSS via the tenth transistors M10, so as to denoise signals output from the output terminals OUT of the GOA7 and the GOA8.

In some embodiments, the GOA units in the pull-up node potential holding unit 10 denoise the output signals from the (N/2)-level GOA units located behind the pull-up node potential holding unit 10, thereby eliminating the GCL signal and the wire associated with the GCL signal. Compared to the fact that a transistor controlled by the GCL signal is added to each GOA unit of the GOA circuit, only the (N/2)-level GOA units located behind the pull-up node potential holding unit 10 of the GOA circuit provided by the embodiments of the present disclosure include the tenth transistors M10 configured for denoising, which reduces the number of transistors in the GOA circuit and is advantageous for saving the power consumption, thereby facilitating a development of a narrow frame of the display panel and a development of a low power consumption.

Some embodiments of the present disclosure provides a method of driving the GOA circuit provided by the foregoing embodiments, and the method includes: providing the low level clock signals to the (N/2)-level GOA units located behind the pull-up node potential holding unit 10 in the touch scan period, so that the gate line scan signals are not output from the (N/2)-level GOA units located behind the pull-up node potential holding unit 10 in the touch scan period; and providing the high level clock signals to each GOA unit in the pull-up node potential holding unit 10, so that the high level signal is output from the output terminal of each GOA unit in the pull-up node potential holding unit 10, thereby causing that the pull-up nodes PU of the (N/2)-level GOA units located behind the pull-up node potential holding unit 10 are maintained at a high level in the touch scan period.

The specific working process of the GOA circuit in the touch scan period has been described in detail in some embodiments of the present disclosure, which is not repeated here.

In the method of driving the GOA circuit provided by the foregoing embodiments of the present disclosure, the low level clock signals are input to the (N/2)-level GOA units located behind the pull-up node potential holding unit 10 in the touch scan period, so that the gate line scan signals are not output from the (N/2)-level GOA units located behind the pull-up node potential holding unit 10 in the touch scan period. Moreover, the high level clock signals are input to each GOA unit in the pull-up node potential holding unit 10, so that the high level signal is output from the output terminal of each GOA unit in the pull-up node potential holding unit 10, thereby causing that the pull-up nodes PU of the (N/2)-level GOA units located behind the pull-up node potential holding unit 10 are maintained at a high level in the touch scan period. Thereby, the electrical leakage of the pull-up nodes PU of the several GOA units required to be turned on is avoided in the touch scan period, thereby avoiding the problem that the H-line phenomenon occurs at the fixed positions in the pixel area due to the insufficient output voltages from the several GOA units after the end of the touch scan period.

In some embodiments, the (N/2)-level GOA units located behind the pull-up node potential holding unit include denoising sub-circuits, and in the touch scanning period, the high level signals output from the output terminals of GOA units in the pull-up node potential holding unit may also denoise the output signals from the (N/2)-level GOA units located behind the pull-up node potential holding unit, thereby avoiding that the gate line scan signals are output in the touch scan period, and avoiding affecting the display effect of the display panel.

The driving method provided by the embodiments of the present disclosure may further include a driving method in the display period, and the display period includes an input period, an output period and a reset period.

In the input period, the signal from the first input terminal INPUT1 is input by the first input sub-circuit 20 to the pull-up node PU under the control of the first input terminal INPUT1.

In the output period, the signal from the clock signal terminal CLK is output as a gate line scan signal by the output sub-circuit 40 to the output terminal OUT under the control of the potential at the pull-up node PU.

In the reset period, the potential at the pull-up node PU is pulled down by the second input sub-circuit 30 to the potential at the first voltage terminal VSS under the control of the second input terminal INPUT2, and the voltage from the second voltage terminal GCH is output by the pull-down control sub-circuit 50 to the pull-down node PD under the control of the second voltage terminal GCH. Under the control of the potential at the pull-down node PD, the potentials at the output terminal OUT and the pull-up node PU are pulled down by the pull-down sub-circuit 60 to the potential at the first voltage terminal VSS.

In some embodiments, the working processes of the input period, the output period and the reset period have been described in detail above, which are not repeated here.

Figure 8:
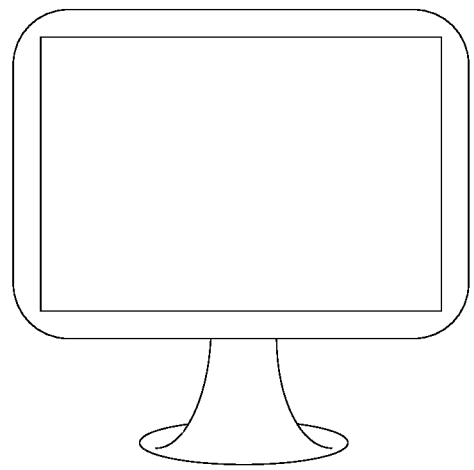
FIG. 8 shows a touch display device having the built-in GOA circuit shown in FIG. 4 according to some embodiments of the present disclosure.

As shown in FIG. 8, some embodiments of the present disclosure provide a touch display apparatus, and the display apparatus includes the GOA circuit described in the above embodiments. Beneficial effects of the display apparatus provided by the embodiments of the present disclosure are the same as the beneficial effects of the GOA circuit provided by the foregoing embodiments, which are not repeated here.

In some embodiments, the touch display apparatus includes at least a liquid crystal display apparatus or an organic light-emitting diode display apparatus. For example, the touch display apparatus may be any product or component having a display function such as a liquid crystal display, a liquid crystal television, a digital photo frame, a mobile phone or a tablet computer. The embodiments of the present disclosure do not limit a touch type of the touch display apparatus. For example, the touch display apparatus may be a display apparatus using an in cell touch technology.

The foregoing descriptions are merely some implementation manners of the present disclosure, but the protection scope of the present disclosure is not limited thereto. Any person skilled in the art could readily conceive of changes or replacements within the technical scope of the present disclosure, which shall all be included in the protection scope of the present disclosure. Therefore, the protection scope of the present disclosure shall be subject to the protection scope of the claims.

What is claimed is:

1. A GOA circuit, comprising a plurality of cascaded GOA units, wherein each GOA unit includes a first input terminal, a second input terminal, an output terminal, voltage terminals and a clock signal terminal; and the GOA circuit is configured to receive N clock signals in one clock period, the clock signal terminal of the GOA unit is configured to receive one of the N clock signals in one clock period, and N is a positive even number;

first input terminals of a first-level GOA unit to a (N/2)th-level GOA unit are coupled to a first signal terminal, a first input terminal of a (N/2+1)th-level GOA unit is coupled to an output terminal of the first-level GOA unit, a first input terminal of a (N/2+2)th-level GOA unit is coupled to an output terminal of a second-level GOA unit, and so on;

second input terminals of a last-level GOA unit to a (N/2)th last-level GOA unit are coupled to a second signal terminal, a second input terminal of a (N/2+1)th last-level GOA unit is coupled to an output terminal of the last-level GOA unit, a second input terminal of a (N/2+2)th last-level GOA unit is coupled to an output terminal of a second last-level GOA unit, and so on; and N/2 cascaded GOA units of the plurality of cascaded GOA units are included in a pull-up node potential holding unit, and output terminals of the GOA units in the pull-up node potential holding unit are not coupled to gate lines.

2. The GOA circuit according to claim 1, wherein the GOA unit further includes a first input sub-circuit, a second input sub-circuit, an output sub-circuit, a pull-down control sub-circuit and a pull-down sub-circuit;

the first input sub-circuit is coupled to the first input terminal and a pull-up node, and the first input sub-circuit is configured to input a signal from the first input terminal to the pull-up node under control of the first input terminal;

the second input sub-circuit is coupled to the second input terminal, the pull-up node and a first voltage terminal, and the second input sub-circuit is configured to output a signal from the first voltage terminal to the pull-up node under control of the second input terminal;

the output sub-circuit is coupled to the pull-up node, the clock signal terminal and the output terminal, and the output sub-circuit is configured to output a signal from the clock signal terminal to the output terminal under control of a potential at the pull-up node;

the pull-down control sub-circuit is coupled to a second voltage terminal, the pull-up node, a pull-down node and the first voltage terminal, the pull-down control sub-circuit is configured to output the signal from the first voltage terminal to the pull-down node under control of a potential at the pull-up node, and output a voltage from the second voltage terminal to the pull-down node under control of the second voltage terminal; and the pull-down sub-circuit is coupled to the pull-down node, the pull-up node, the output terminal and the first voltage terminal, and the pull-down sub-circuit is configured to output the signal from the first voltage terminal to the the output terminal and the pull-up node under control of a potential at the pull-down node.

3. The GOA circuit according to claim 2, wherein each of (N/2)-level GOA units disposed behind the pull-up node potential holding unit further includes a denoising sub-circuits, the denoising sub-circuit of any GOA unit of the (N/2)-level GOA units located behind the pull-up node potential holding unit is coupled to the first voltage terminal, an output terminal of the same-level GOA unit and an output terminal of a corresponding-level GOA unit in the pull-up node potential holding unit, and the denoising sub-circuit is configured to denoise an output signal of the output terminal of the same-level GOA unit under control of the output signal from the output terminal of the corresponding-level GOA unit in the pull-up node potential holding unit in a touch scan period.

4. The GOA circuit according to claim 2, wherein the first input sub-circuit includes a first transistor, a gate and a first electrode of the first transistor is coupled to the first input terminal, and a second electrode of the first transistor is coupled to the pull-up node.

5. The GOA circuit according to claim 2, wherein the second input sub-circuit includes a second transistor, a gate of the second transistor is coupled to the second input terminal, a first electrode of the second transistor is coupled to the pull-up node, and a second electrode of the second transistor is coupled to the first voltage terminal.

6. The GOA circuit according to claim 2, wherein the output sub-circuit includes a third transistor and a first capacitor;
a gate of the third transistor is coupled to the pull-up node, a first electrode of the third transistor is coupled to the clock signal terminal, and a second electrode of the third transistor is coupled to the output terminal; and
one end of the first capacitor is coupled to the pull-up node, and another end of the first capacitor is coupled to the output terminal.

7. The GOA circuit according to claim 2, wherein the pull-down control sub-circuit includes a fourth transistor, a fifth transistor, a sixth transistor and a seventh transistor;
a gate and a first electrode of the fourth transistor are coupled to the second voltage terminal, and a second electrode of the fourth transistor is coupled to a gate of the fifth transistor and a first electrode of the seventh transistor; and a first electrode of the fifth transistor is coupled to the second voltage terminal, and a second electrode of the fifth transistor is coupled to the pull-down node; and
a gate of the sixth transistor is coupled to the pull-up node, a first electrode of the sixth transistor is coupled to the pull-down node, and a second electrode of the sixth transistor is coupled to the first voltage terminal; and a gate of the seventh transistor is coupled to the pull-up node, and a second electrode of the seventh transistor is coupled to the first voltage terminal.

8. The GOA circuit according to claim 2, wherein the pull-down sub-circuit includes an eighth transistor and a ninth transistor;
a gate of the eighth transistor is coupled to the pull-down node, a first electrode of the eighth transistor is coupled to the pull-up node, and a second electrode of the eighth transistor is coupled to the first voltage terminal; and
a gate of the ninth transistor is coupled to the pull-down node, a first electrode of the ninth transistor is coupled to the output terminal, and a second electrode of the nine transistor is coupled to the first voltage terminal.

9. The GOA circuit according to claim 3, wherein the denoising sub-circuit includes a tenth transistor, a gate of the tenth transistor is coupled to the output terminal of the corresponding-level GOA unit in the pull-up node potential holding unit, a first electrode of the tenth transistor is coupled to the output terminal of the same-level GOA unit, and a second electrode of the tenth transistor is coupled to the first voltage terminal.

10. The GOA circuit according to claim 4, wherein the transistor is a N-type transistor or a P-type transistor.

11. A method of driving the GOA circuit according to claim 1, the method comprising:
in a touch scan period, providing low level clock signals to (N/2)-level GOA units located behind the pull-up node potential holding unit, so that gate line scan signals are not output from the (N/2)-level GOA units located behind the pull-up node potential holding unit in the touch scan period; and
in the touch scan period, providing a high level clock signal to each GOA unit in the pull-up node potential holding unit, so that a high level signal is output from an output terminal of each GOA unit in the pull-up node potential holding unit, thereby causing that pull-up nodes of the (N/2)-level GOA units located behind the pull-up node potential holding unit are maintained at a high level in the touch scan period.

12. The method of driving the GOA circuit according to claim 11, wherein each of the (N/2)-level GOA units located behind the pull-up node potential holding unit includes a denoising sub-circuit, and the method further includes:
in the touch scan period, controlling the denoising sub-circuit by using a high level signal output from an output terminal of a corresponding GOA unit in the pull-up node potential holding unit, so that the denoising sub-circuit denoises an output signal from a corresponding one of the (N/2)-level GOA units located behind the pull-up node potential holding unit.

13. The method of driving the GOA circuit according to claim 11, wherein the method further includes:
in an input period, inputting, by a first input sub-circuit, a signal from the first input terminal to a pull-up node under control of the first input terminal;
in an output period, outputting, by an output sub-circuit, a signal from the clock signal terminal as a gate line scan signal to the output terminal under control of a potential at the pull-up node; and
in a reset period, pulling down, by a second input sub-circuit, the potential at the pull-up node to a potential at a first voltage terminal under control of the second input terminal, outputting, by a pull-down control sub-circuit, a signal from a second voltage terminal to a pull-down node under control of the second voltage terminal, and pulling down, by a pull-down sub-circuit, potentials at the output terminal and the pull-up node to the potential at the first voltage terminal under control of a potential at the pull-down node, wherein
the input period, the output period and the reset period are included in a display period.

14. A touch display apparatus, comprising the GOA circuit according to claim 1.

* * * * *